United States Patent [19]
Muhlhoff

[11] Patent Number: 6,039,099
[45] Date of Patent: Mar. 21, 2000

[54] SAFETY INSERT WITH WARNING FUNCTION

[75] Inventor: Olivier Muhlhoff, Clermont-Ferrand, France

[73] Assignee: Compagnie Generale des Etablisse-Michelin-Michelin & Cie, Clermont-Ferrand Cedex, France

[21] Appl. No.: 08/978,064

[22] Filed: Nov. 25, 1997

[30] Foreign Application Priority Data

Nov. 26, 1996 [FR] France .................................. 96 14563

[51] Int. Cl.⁷ ............................ B60C 17/04; B60C 17/00
[52] U.S. Cl. .......................................... 152/158; 152/520
[58] Field of Search .................................. 152/155, 157, 152/518, 520, 158

[56] References Cited

U.S. PATENT DOCUMENTS 3,085,615  4/1963  Sanderson .
3,712,359  1/1973  Williams .................................. 152/158
4,262,724  4/1981  Sarkissian ................................. 152/340
4,337,813  7/1982  Rach et al. .......................... 152/209 R
5,634,993  6/1997  Drieux et al. .

FOREIGN PATENT DOCUMENTS 0018831  11/1980  European Pat. Off. .
2004234 U  3/1979  United Kingdom .

Primary Examiner—Michael W. Ball
Assistant Examiner—Barbara J. Musser
Attorney, Agent, or Firm—Baker Botts L.L.P.

[57] ABSTRACT

A safety insert, intended to be mounted on a wheel rim inside a tire to support the crown of this tire in the event of a loss of inflation pressure, wherein the running radius of the safety insert under run-flat conditions varies with a frequency of variation that is appreciably equal to its frequency of rotation.

14 Claims, 4 Drawing Sheets

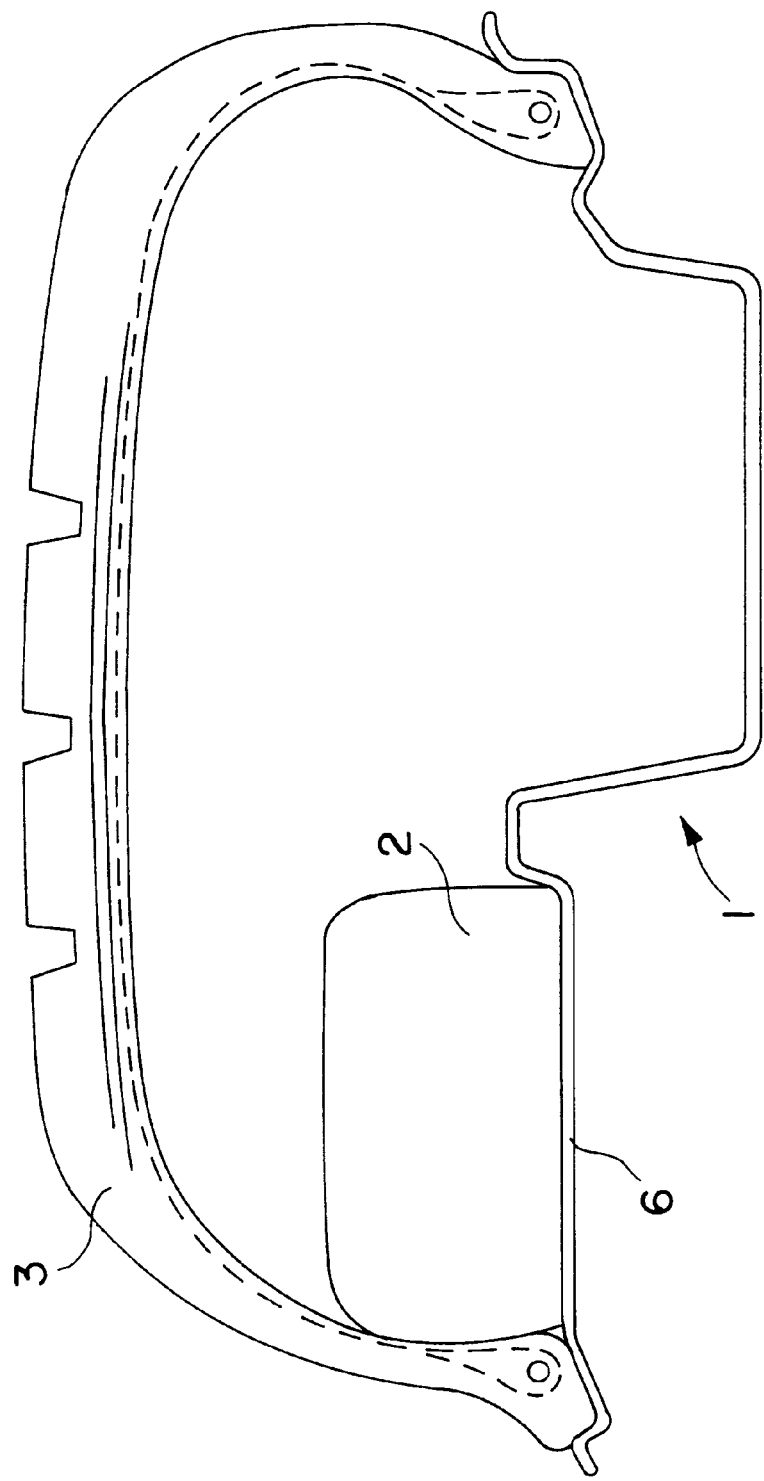
FIG. I
PRIOR ART

SAFETY INSERT WITH WARNING FUNCTION

BACKGROUND OF THE INVENTION

The invention relates to a safety insert for use with a tire to detect when the tire is resting on the safety insert. The safety insert warns the driver as soon as the tire starts to rest on it following a puncture or in the event of significant loss of pressure.

The purpose of these safety inserts, which in general are mounted on the wheel rim inside the tire, is to take up the load in the event of tire failure.

When the tire starts to rest on the safety insert, this is accompanied by a more or less pronounced deterioration in tire performance, and it is possible that this deterioration will not be noticed by the driver through the handling of the vehicle and the comfort provided by the vehicle. What is more, these inserts have a limited useful life. It is therefore essential, for his safety, that the driver should be warned as soon as a tire starts to rest on its safety insert, so that he can follow the instructions prescribed by the insert manufacturer.

A number of safety inserts that incorporate means for warning the driver that the tire is resting on the insert have already been proposed.

U.S. Pat. No. 4,262,724 in particular proposes a safety insert intended to be mounted in an assembly comprising a tire and a wheel rim and to be mounted radially externally relative to the wheel rim. This insert has a radially exterior surface which defines a radial support for the crown of the tire when the tire is deflated, and whose running radius under run-flat conditions varies between a minimum radius and a maximum radius in order to create a running vibration. More specifically, this radially exterior surface has two circumferential regions, the first having the maximum radius, the second having the minimum radius, the two regions being connected by transition zones with intermediate radii.

This patent also proposes that one or more bumps be built into the safety insert. This solution makes driving very uncomfortable especially at low speeds. All this solution does is prevent the vehicle from being instantly immobilized in the event of tire failure. By contrast, when one wishes to use the vehicle, even at a limited speed for long distances, the warning transmitted by the insert needs to be compatible with driving safely, needs not to harm the mechanical structures while at the same time being perfectly perceptible to the driver.

SUMMARY OF THE INVENTION

In the face of these difficulties, the subject of the invention is a safety insert which warns the driver as soon as the tire starts to rest on it, over a broad range of vehicle speeds while at the same time remaining tolerable both for the driver and for the mechanical structures, in the range of permitted speeds.

The safety insert according to the invention, intended to be mounted in an assembly comprising a tire and a wheel rim and to be mounted radially externally relative to the wheel rim, the running radius of said safety insert under run-flat conditions varying between a minimum radius and a maximum radius in order to create a running vibration, is one wherein said running radius varies appreciably sinusoidally between the maximum radius and the minimum radius in order to create a vibration the frequency of which is equal to the frequency of rotation of said tire and wheel rim assembly.

The advantage of this safety insert is that during run-flat conditions it produces vibration whose energy increases with vehicle speed across a broad range of speeds. There is therefore no possible ambiguity in the way the driver can interpret this vibration in this range of speeds. This vibration can be tolerated by drivers at low speeds, while still being noticeable at high speeds, even when, above a certain speed, its energy does not increase any further with speed.

According to a first embodiment of the safety insert according to the invention, the radius of the radially exterior surface of said safety insert varies appreciably sinusoidally between a minimum radius and a maximum radius.

This safety insert may have a cylindrical region with maximum radius that represents less than one quarter of the circumference of the radially exterior surface of the safety insert.

The vibration produced by an insert of this kind during run-flat conditions is almost always limited to its rotational frequency.

An alternative to this first embodiment of a safety insert according to the invention consists in the radially exterior surface of the safety insert being cylindrical with its central axis offset relative to the axis of rotation of the tire and wheel rim assembly.

According to a second embodiment, the variation in running radius of the safety insert according to the invention under run-flat conditions is obtained by a circumferential variation in the radial rigidity of said insert.

This circumferential variation in the radial rigidity of the safety insert may in particular be obtained through a circumferential variation in the relative contents of at least two materials with different rigidities, or a circumferential variation in density.

Of course, the variation in running radius under run-flat conditions may also be obtained by a combination of circumferential variations in radius, in rigidity and in density.

Whether or not the vibrations produced by the safety insert according to the invention under run-flat conditions can be tolerated is directly related to the amplitude of the variation in running radius under run-flat conditions. This amplitude is advantageously between 1.5 and 4.0% of the diameter of the tire and preferably between 2.5 and 3.0%.

Advantageously, the safety insert according to the invention additionally comprises means for generating a running noise under run-flat conditions. These means may be a collection of strips the height of which is between 0.1 and 1.0% of the diameter of the tire. This running noise, which is not enough on its own, has the advantage of reminding the driver that he is running flat, especially at high speeds.

The safety insert according to the invention also preferably has zero static imbalance.

DESCRIPTION OF THE DRAWINGS

The following figures illustrate a number of embodiments of the invention and afford an understanding of all its advantages:

FIG. 1 is a diagrammatic sectional view of a wheel rim equipped with a prior art safety insert;

DESCRIPTION OF PREFERRED EMBODIMENTS

A wheel rim 1 equipped with an annular safety insert 2 can be seen in FIG. 1. The special geometry of this wheel rim 1 is described in particular in French Patent Application No. 2 713 558. It has two bead seats of different diameters and is particularly well-suited to the easy fitting of this safety insert 2. This assembly allows running despite a significant drop in pressure in the tire 3. When running under such conditions, the interior of the deformed tire rubs against the exterior surface of the insert, causing heating which limits the available radius of action: it is therefore important that the driver should be informed as soon as a tire starts to rest on its insert 2.

To achieve this, use is advantageously made of a safety insert according to the invention whose running radius under run-flat conditions varies with a frequency of variation that is appreciably equal to its frequency of rotation.

Figure 2A:
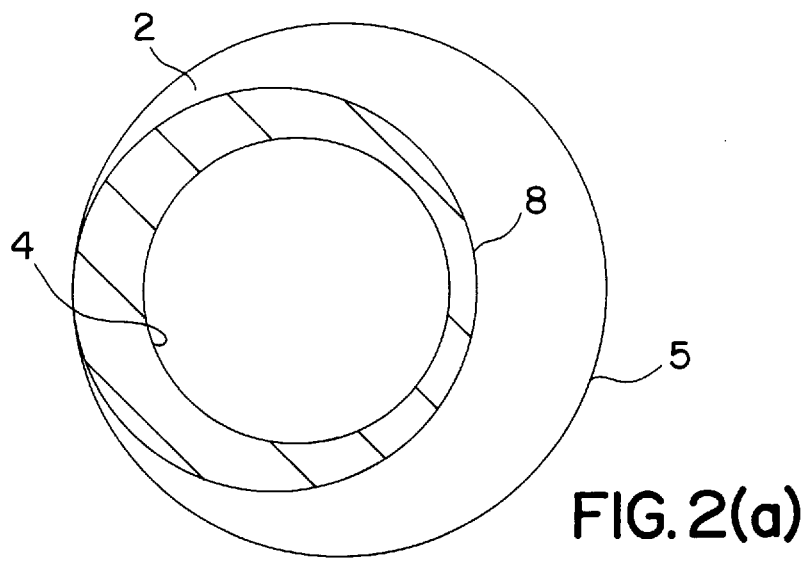
FIG. 2 depicts a safety insert according to the invention: in circumferential section in FIG. 2(a), and in axial section in FIG. 2(b)
Figure 2B:
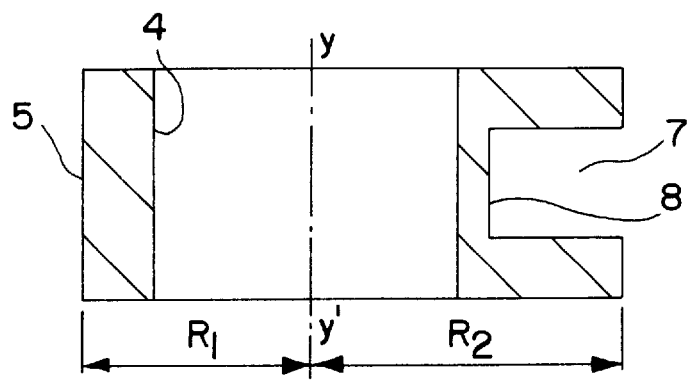

An insert of this kind is shown in FIG. 2. It has a cylindrical radially interior surface 4 the radius of which is more or less equal to that of the bearing surface 6 of the wheel rim 1. Its radially exterior surface 5 is also cylindrical, but with its central axis offset with respect to the central axis YY' of the surface 4 which is also the axis of rotation of the tire/wheel rim/safety insert assembly. The result of this is that the radius of the exterior surface 5 varies between a minimum radius $R_1$ and a maximum radius $R_2$ (FIG. 2(b)). These two radii are diametrically opposed. As the exterior surface 5 is cylindrical, the radius of this surface relative to the axis YY' of rotation of the tire/wheel rim and safety insert assembly varies appreciably sinusoidally between $R_1$ and $R_2$. The safety insert 2 has a cavity 7 open radially to the outside, whose cross section varies angularly continuously so that the center of gravity of the insert is on the axis YY' and a zero static imbalance is thus obtained. This cavity 7 ceases to exist at the point where the radius of the exterior surface 5 of the insert 2 is at its minimum. The cavity 7 could also be completely internal or open at the side.

For equipping tires with dimensions 185/70×350 (dimensions in millimeters), the difference between the radii $R_1$ and $R_2$ is of the order of 15 mm. As the diameter of these tires is approximately 500 mm, the difference between the two radii is therefore of the order of 3% of this diameter. Depending on the vehicle and tires concerned, the difference between these radii may vary appreciably, while preferably remaining of the order of 2.5 to 3% of the diameter of the tires.

The safety insert 2 has enough radial rigidity for the compression it experiences under load not to alter appreciably the previous difference of 15 mm when running flat. An insert of this kind is made for example of rigid rubber, rigid polyurethane or nylon. It may also be made of a rubber that has a relatively low shear modulus when it is solid. It may have a layer of high circumferential rigidity arranged along its interior surface 4. The exterior surface of the insert is preferably lubricated in order to limit the amount of heating when running flat, and thus improve its endurance.

Figure 3:
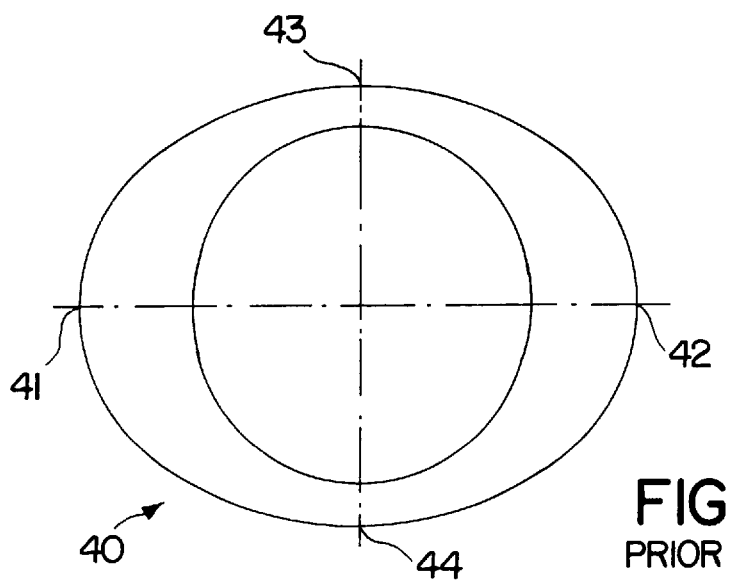
FIG. 3 depicts a circumferential section through a known safety insert with two regions of maximum radius.

FIG. 3 shows, in circumferential section, a known safety insert 40, with geometry similar to the one shown in FIG. 20 of the U.S. Pat. No. 4,262,724. This insert has two regions of maximum radius 41 and 42 separated by two regions 43 and 44 of minimum radius. The transition between these regions is very gradual.

Figure 4:
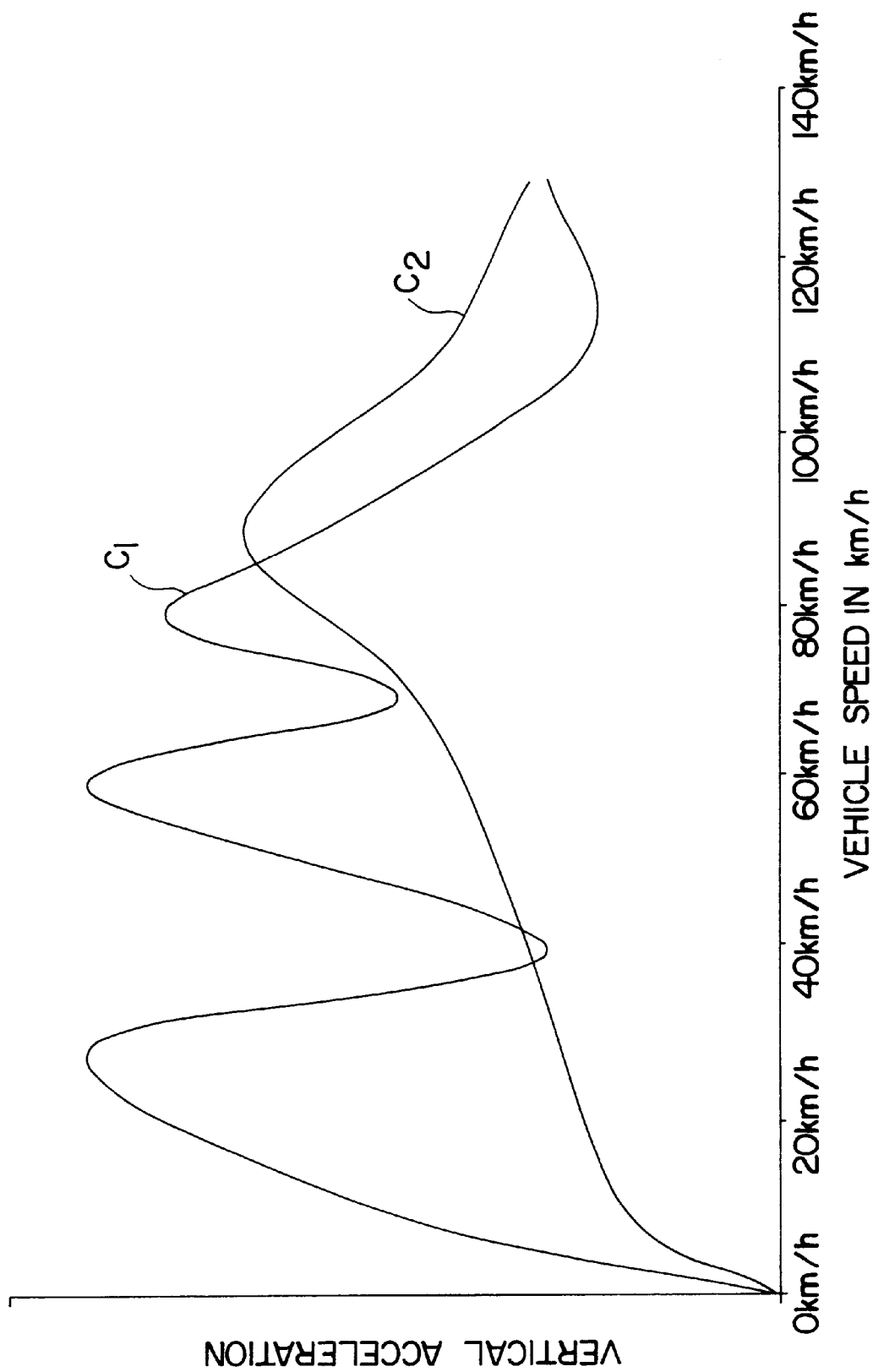
FIG. 4 shows the change in the amount of vibration produced by the safety inserts of FIGS. 2 and 3 as a function of running speed for a given vehicle.

FIG. 4 shows the change in amount of vibration produced by safety inserts 2 and 40, with the same $R_2$–$R_1$ height as a foundation of lnning speed for a Peugeot 405. This vehicle is equipped with a vertical-acceleration sensor arranged on the driver's seat. This sensor thus quantifies the excitation transmitted to the driver and felt by him.

Curve C1 shows the change in vertical-acceleration measurements taken as a function of the vehicle speed with one of the tires filly deflated, this tire being equipped with a safety insert 40 with two regions of maximum radius, like the one in FIG. 3.

This curve C1 shows that the vertical acceleration produced by the eccentricity of the insert 40 as it runs flat changes more or less in proportion with the speed up to about 30 km/h. Thereafter, a very pronounced reduction followed by two more maxima are observed. Above 85 km/h, the reduction is particularly pronounced. This insert therefore has a very narrow correct range of use, restricted to about 30 km/h. Thereafter, the changes are very variable and the ordinary driver will therefore find it impossible to interpret them satisfactorily.

Curve C2 shows the change in the amount of vertical acceleration measured when the deflated tire is fitted with an insert 2 according to the invention. In this case, the change in vertical acceleration remains practically proportional to the vehicle's speed up to about 100 km/h. Thereafter, this intensity decreases.

This insert therefore works perfectly well up to relatively high speeds because the strength of the warning is proportional to the speed of the vehicle.

In point of fact, throughout the first part of this curve, the crown of the deflated tire rests continuously on the radially exterior surface of the insert For each revolution of the wheel, the wheel center therefore experiences a change in position relative to the ground that appreciably corresponds to the difference between $R_1$ and $R_2$ (give or take the variations due to compression). The increase in the amount of vertical acceleration measured is thus directly connected to the increase in rotational frequency of the wheel and of the insert.

By contrast, above the maximum of curve C2, because of the wheel/tire/insert assembly inertia, the crown of the tire no longer rests continuously against the radially exterior surface of the insert, particularly against the part with minimum radius $R_1$. This means that the variation in position relative to the ground of the wheel center is less than the difference between $R_1$ and $R_2$ (give or take the variations due to compression) and decreases gradually as the vehicle speed increases. Correspondingly, the amount of vertical acceleration measured also decreases.

For an insert to be effective across the broadest possible range of speeds it is therefore essential that there be just one region of maximum radius per revolution, that the circumferential size of this region be as small as possible, and that the transition between $R_1$ and $R_2$ be gradual. This is what is achieved with an insert according to the invention which has an appreciably sinusoidal variation between the maximum and minimum radii.

This special shape also has the advantage of producing a vibration whose frequency is appreciably equal to the frequency of rotation of the insert alone. All the energy of vibration is thus concentrated into this frequency which can easily be transmitted to the driver through the various components in the vehicle suspension.

An insert with a region of maximum radius that extends over not more than 25% of the circumference of the insert also gives more or less very similar results.

By contrast with the insert of the invention, the inserts proposed in the U.S. Pat. No. 4,262,724 have several circumferential regions with maximum radius (FIG. 20) or just one region but which has a circumferential size of 75% of the circumference (FIG. 14 and 18) or 50% (examples). Such inserts, as we have seen, are effective only in a far narrower range of speeds than inserts according to the invention. What is more, these inserts have zones of transition between the regions of maximum and of minimum radius which are quite steep (see FIG. 14). The consequence of this is that these zones behave like actual bumps, and this plays a part in making running flat highly unpleasant even at low speed.

In the foregoing example, the variation in running radius under ran-flat conditions is obtained by varying the radius of the insert. It is also possible to obtain this variation in running radius by many other means.

Figure 5:
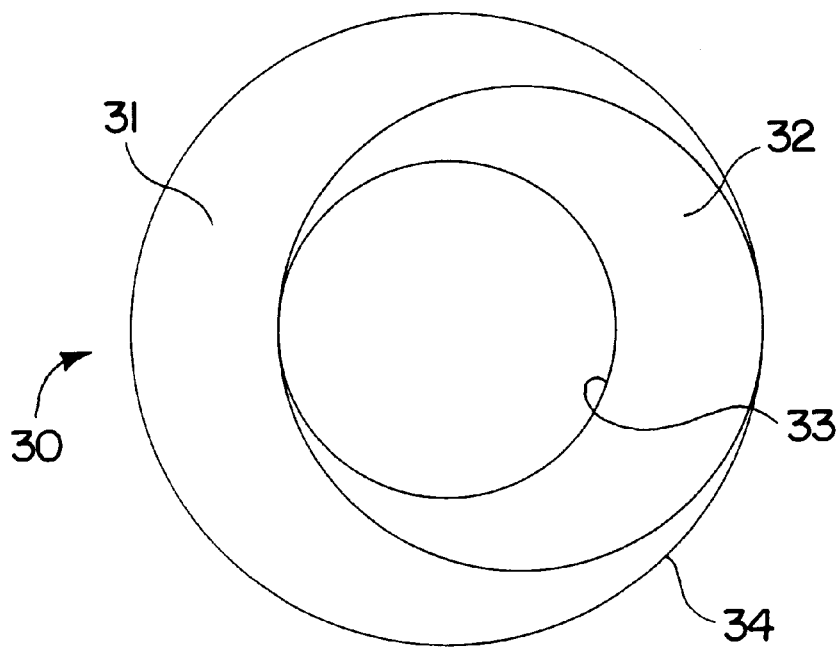
FIG. 5 shows a circumferential section through an alternative form of safety insert according to the invention.

By way of example, FIG. 5 shows a cylindrical insert 30 that is made of two materials of different rigidities 31 and 32. The proportion of each material varies angularly continuously to obtain an appreciably sinusoidal variation in radial rigidity and thus in the running radius of the insert when compressed. In this example, the radially interior surface 33 and the radially exterior surface 34 of the insert 30 are coaxial.

Figure 6:
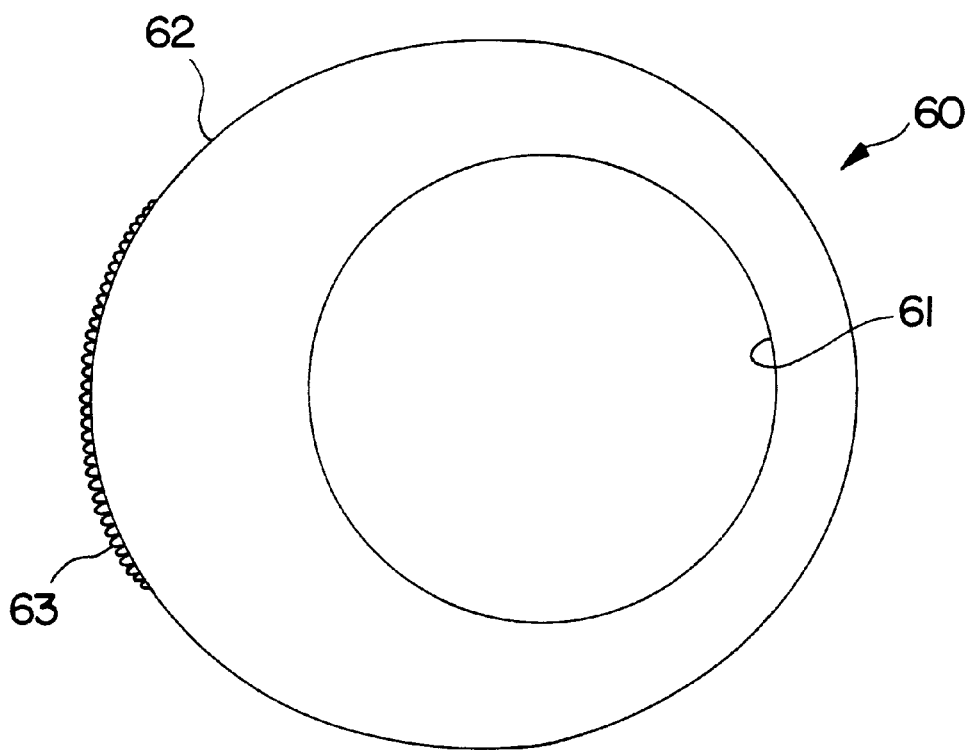
FIG. 6 shows another alternative form of safety insert according to the invention.

To supplement the warning effect of the safety insert according to the invention, at high speeds, strips may be added to the exterior surface of the insert. Since at high speeds, contact between the crown of the tire and the radially exterior surface of the insert is increasingly limited to the region of maximum radius and its surroundings, these strips need to be placed preferably in this area. The purpose of the strips is to create a whistling noise that the driver will notice. FIG. 6 shows an insert 60 equipped with such strips 63 in the shape of half cylinders, arranged about the axis of rotation of the insert 60. Their height needs to be smaller than the difference between the radii $R_1$ and $R_2$ so that at low speeds they do not disrupt the excitation vibration produced, whose frequency is equal to the frequency of rotation of the insert. A satisfactory height is of the order of 0.1 to 1% of the diameter of the tire which means, in the earlier example, of the order of 0.5 to 5 mm.

Like in the case of the insert 2 in FIG. 2, the radially interior surface 61 and the radially exterior surface 62 are cylindrical but not coaxial. The strips 63 are uniformly distributed on the surface of the insert on either side of the maximum radius $R_2$. There are, for example, of the order of 10 to 100 of them, and preferably of the order of 10 to 60 of them. In the example shown, there are about 30 strips.

I claim:

1. A safety insert intended to be mounted in an assembly comprising a tire and a wheel rim and to be mounted radially externally relative to the wheel rim, said insert having a radially exterior surface which defines a radial support for the crown of the tire when said tire is deflated, the running radius of said safety insert under run-flat conditions varying between a minimum radius and a maximum radius over 180° in order to create a running vibration, wherein said running radius varies appreciably sinusoidally between the maximum radius and the minimum radius over 180° in order to create a vibration the frequency of which is equal to the frequency of rotation of said tire and wheel rim assembly.

2. The safety insert as claimed in claim 1, wherein the radius of the radially exterior surface varies appreciably sinusoidally between a minimum radius and a maximum radius.

3. The safety insert as claimed in claim 2, wherein the radially exterior surface has a cylindrical region with maximum radius that represents less than one quarter of the circumference of said exterior surface.

4. The safety insert as claimed in claim 1, wherein the radially exterior surface of said safety insert is cylindrical with its central axis offset relative to the axis of rotation of the tire and wheel rim assembly.

5. The safety insert as claimed in claim 1, wherein the variation in running radius of said safety insert under run-flat conditions is obtained by circumferential variation in the radial rigidity of said insert.

6. The safety insert as claimed in claim 5, wherein the circumferential variation in radial rigidity is connected to a circumferential variation in the relative contents of at least two materials with different rigidities.

7. The safety insert as claimed in claim 4, wherein the circumferential variation in radial rigidity is connected to a circumferential variation in the density of said safety insert.

8. The safety insert as claimed in claim 1, wherein the variation in running radius of said safety insert under run-flat conditions is between 1.5 and 4.0% of the diameter of said tire.

9. The safety insert as claimed in claim 8, wherein the variation in running radius of said safety insert under run-flat conditions is between 2.5 and 3.0% of the diameter of said tire.

10. The safety insert as set forth in claim 1 including means for generating running noise.

11. The safety insert as claimed in claim 10, wherein the means for generating a running noise comprise a collection of 10 to 100 strips oriented transversely and distributed over the maximum-radius region and on either side thereof.

12. The safety insert as set forth in claim 11, wherein the strips have a height of between 0.1 and 1% of the diameter of said tire.

13. The safety insert as claimed in claim 1 in which its static imbalance is zero.

14. The safety insert as claimed in claim 13, which has a cavity whose cross section varies angularly continuously so that its static imbalance is zero.

* * * * *

UNITED STATES PATENT AND TRADEMARK OFFICE
CERTIFICATE OF CORRECTION

PATENT NO. : 6,039,099
DATED : March 21, 2000
INVENTOR(S) : Olivier Muhlhoff

Page 1 of 1

It is certified that error appears in the above-identified patent and that said Letters Patent is hereby corrected as shown below:

In the Specification:

Column 4, line 5: "Inning" should read --running--.

Signed and Sealed this

Fifth Day of June, 2001

*Attest:*

*Attesting Officer*

NICHOLAS P. GODICI
*Acting Director of the United States Patent and Trademark Office*